May 19, 1970   W. R. HERSHEY   3,512,481
AIR SUPPORTED AND AIR PROPELLED VEHICLE RACERS
Filed Sept. 18, 1967
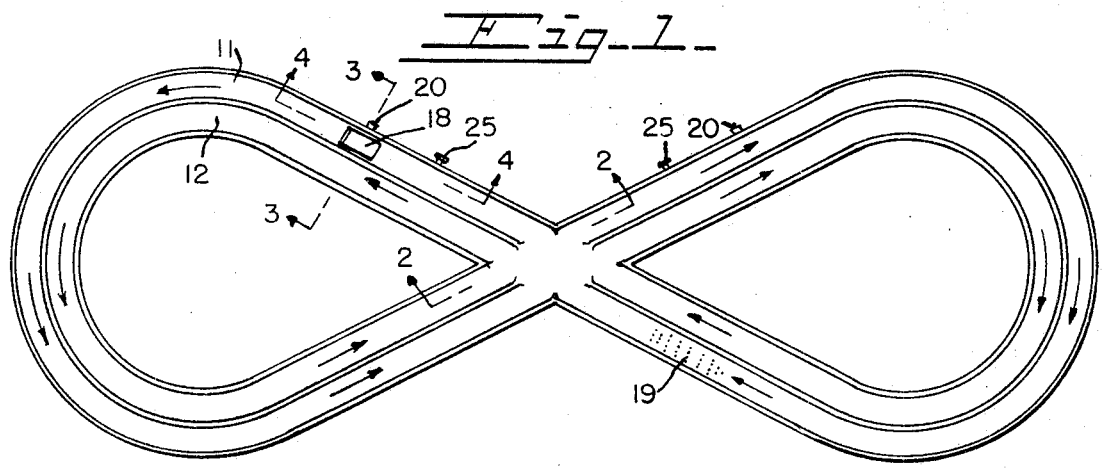
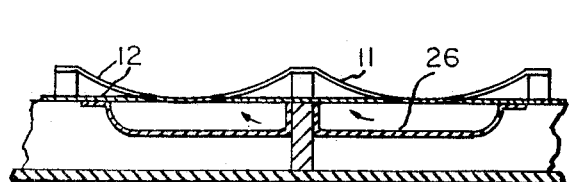
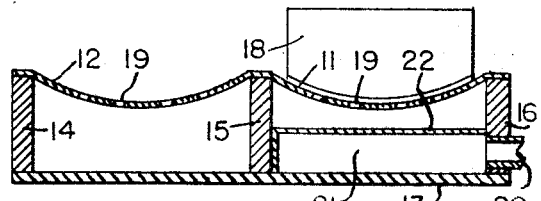
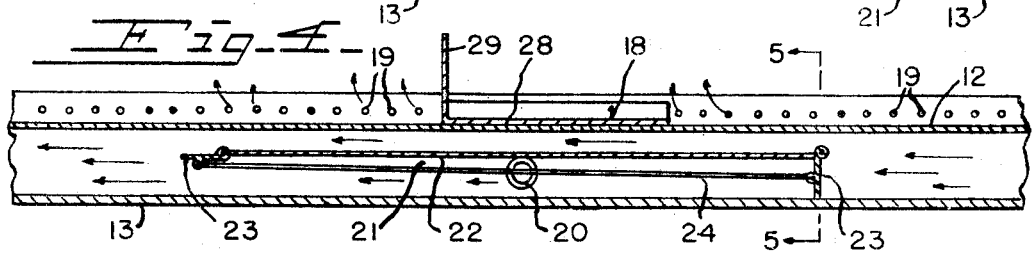
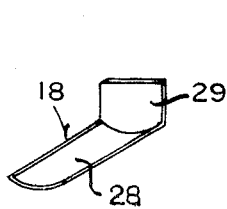
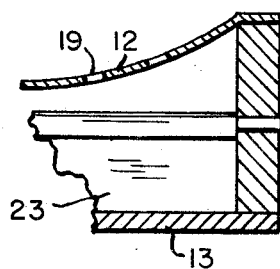
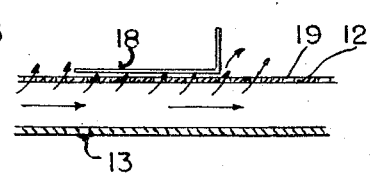
INVENTOR
WILLIAM R. HERSHEY.
BY
ATTORNEY.

United States Patent Office 3,512,481
Patented May 19, 1970

3,512,481
AIR SUPPORTED AND AIR PROPELLED
VEHICLE RACERS
William R. Hershey, 7431 S. Mingo Lane,
Madeira, Ohio 45243
Filed Sept. 18, 1967, Ser. No. 668,353
Int. Cl. B60v 1/04; B61b 13/08
U.S. Cl. 104—23
2 Claims

ABSTRACT OF THE DISCLOSURE

Air supported vehicles on multiple tracks propelled by jet streams of air.

My invention relates to multiple tracks whose cross-section is a circular arc to support and retain vehicles shaped to the cross-section of the track and supported and propelled by jet streams of air. Air is admitted to the plenum chamber under the track by means of a blower. The air must be distributed properly; otherwise, the high velocity air stream from the blower may produce a low pressure region below the holes in the track near the supply port.

If a horizontal velocity is imparted to the air in the plenum chamber, it is found that the velocity of the air blowing through the holes has not only a vertical component which supports the vehicle, but also a horizontal component which propels the vehicle in the same direction as the flow of air in the plenum chamber.

I have constructed a device which solves both the problem of the proper distribution of the high velocity incoming air and the problem of controlling the direction of the air stream within the plenum chamber. The plenum chamber is divided into upper and lower sections for a short distance on either side of the air input duct. Air from the blower is introduced into the lower section or manifold chamber. Turbulence is substantially reduced as the air flows through this lower section. Hinged flaps on either end of the lower section determine from which end the air will flow. The flaps are connected so that one will be open when the other is closed. They are controlled by means of an external knob. The upper section between the track and partition is open at both ends so that the holes above the partition will be supplied with moving air from whichever direction it is moving.

The object of my invention is to provide a continuous multiple track which may be of varying design, whereon vehicles will be air supported and propelled in the direction of the flow of air, to permit competitive operation of the vehicles on the tracks with each track having its own air supply.

A further object is to construct the vehicles with a forward upward fin to increase the speed of the movement of the vehicle.

A further object is to provide means for controlling the direction of air flow on the tracks.

My invention will be further readily understood from the following description and claims, and from the drawings, in which latter:

FIG. 1 is a plan view of my improved device.

FIG. 2 is an enlarged section, taken in the plane of the line 2—2 of FIG. 1.

FIG. 3 is an enlarged vertical cross-section, taken in the plane of the line 3—3 of FIG. 1.

FIG. 4 is a longitudinal section, showing the valve mechanism, taken in the plane of the line 4—4 of FIG. 1.

FIG. 5 is an enlarged detail section of the valve control, taken in the plane of the line 5—5 of FIG. 4.

FIG. 6 is a perspective view of the vehicle.

FIG. 7 is a diagrammatic view of the air flow around the vehicle.

My improved device consists of tracks 11 and 12 shown in the form of a figure eight with the tracks having the same length, however, the particular design formation may be varied without departing from the scope of my invention.

The tracks are mounted on a base 13 and supported above the base by supports 14, 15 and 16. The tracks are of a trough shape to support vehicles 18 and a series of apertures 19 throughout the entire track surface emit air. The diameter of the apertures 19 is approximately twice the dimension of the thickness of the surface of the track, so that the emerging air jets may give lift and push to the vehicle, by the allowance of a horizontal component of air velocity as well as are upward component to pass through the apertures.

Each track is provided with an air supply port 20 to receive air under pressure from any suitable source into a manifold chamber 21 having an upper surface 22 spaced below the track. Pivoted vane valves 23 at each end of the chamber 21 are connected by a rod 24. One of the vane valves 23 has a control knob 25 attached thereto to turn the valves in one direction or the other to allow the air to escape from the manifold chamber in the desired direction. This division of the plenum chamber reduces the turbulence of the air entering the chamber and directs it in the desired direction and permits the air passing around the track to pass over the manifold chamber.

At the cross-over of the tracks the air is baffled as at 26 to provide continuous flow of air below each track in the set direction. Arrows in the drawing show the direction of the flow of air.

The vehicle 18 in the present exemplification is shown as having a base 28 of a configuration conforming to the shape of the track with a vertical fin 19 extending upwardly at one end. However, the vehicle may be constructed without the fin. The vehicle 18 is placed on the track with the fin 29 facing the direction of travel. When air under pressure is turned on, the air will slightly lift the vehicle and propel it forward. The air passing through the apertures 19 has a vertical and horizontal component of movement to propel the vehicle around the track.

That only limitation on the material of construction is that of the rigidness required by the track surface. The size of the holes is necessarily related to the thickness of the track, since the holes must allow air to pass through at an angle to the track surface, while the axes of the holes are always perpendicular to the track surface. The thicker the track, the larger the holes must be. But smaller holes emit air jets of higher velocities than do large holes, and since high velocity air jets are held to be desireable, a compromise must be made between track rigidity and the smallness of hole area. As an example, the inventor's model was constructed with track having a thickness of 1/32 inch and holes of 1/16 inch diameter. The material comprising the track surafce must be rigid enough to resist deformation due to air pressure beneath said track surface, yet thin enough to permit the design of small holes for the air jets.

The shape of the track surface is such that vertical cross sections will always cut the track surface in circular arcs. The track surface should be concave, and the radius of curvature of the surface should be constant. A vehicle racer has a lower surface corresponding to the shape of the track. The radius of curvature of its lower surface is constant and should be equal to the radius of curvature of the upper track surface. The circular nature of the track's vertical cross section, and the corresponding circularly curved lower vehicle surface afford the vehicle great stability. If a force is applied laterally to the vehicle, the vehicle will rotate around the axis parallel to the track's longitudinal orientation. The vehicle will have attained a position in the track closer to the top edge, but the bottom surface of the vehicle will still be congruent with the track surface. In an off-center position the vehicle has a potential energy that causes it to tend to move towards its stable position in the center of the track, just as a pendulum tends to move towards a stable position at the bottom of its arc. The cylindrically designed track and lower vehicle surfaces assure unhindered movement of the vehicle as it oscillates to its stable position after being deflected. There is apt to be very little scraping between the vehicle and the track, since the separation distance is uniform between all points on the lower vehicle surface and the track surface. The stability and geometrical congruency resulting from circular cylindrical design is especially beneficial in curved sections of the track, where centrifugal force tends to cause the vehicle to ride closer to the outside edge of the track. When the vehicle comes out of a turn, it oscillates gently back to the center of the track. Thus, the track is essentially banked for any speed. The higher the speed of the vehicle, the closer to the outside edge it will ride. Although the vehicle may leave some of the air jets uncovered as it rotates laterally, the remaining jets still covered will have sufficient force to support the vehicle.

The design of the plenum chamber and manifold chamber combination is such that the air in the plenum chamber attains a circulating motion, since the air which passes over baffle 22 joins the air being introduced to the plenum chamber from the manifold chamber 21. The air in the plenum chamber not only has a pressure, but also a velocity. When air escapes through the apertures 19 in the track surface, the air jets have an upward component of velocity arising from the pressure in the plenum chamber and a horizontal component of velocity arising from the motion of the circulating air in the plenum chamber. The holes must be large enough for air to be emitted at an angle to the track surface. Since the circularly cylindrical nature of the holes makes them symmetrical, and since the axes of the holes are perpendicular to the track surface, the direction of the air jets corresponds to the direction of the air flow in the plenum chamber, and the magnitude of the velocity of the air jets is unaffected by their direction.

The lift force which keeps the vehicle slightly above the track surface arises from the impulse momentum principle. The momentum of the air jets is changed as they impinge upon the bottom of the vehicle. The rate of change of the momentum of the air jets with respect to time equals their lift force which balances the weight of the vehicle. The propulsion of the vehicle arises from a shear force between the bottom of the vehicle and the air jets. The velocity of the air jets has a horizontal component which causes the air beneath the vehicle to flow in the same direction as the air flowing in the plenum chamber. There is a frictional or shear force between the vehicle and the air that is moving beneath it. This shear force tends to drag the vehicle along with the moving air. The vehicle is designed having a uniform bottom surface so that it can be propelled by a shear force in either direction.

When knob 25 is used to change the direction of circulation of the air in the plenum chamber, the direction of the emerging jets is also changed, and hence the direction of motion of the vehicle, whose forward motion is caused by shear forces exerted by the jets. When the knob is turned to a setting intermediate between the two opposite directional settings, the flaps 23 will allow air to flow from both ends of the manifold chamber 21. The circulation will be stopped, and at some point in the circuit of the track, the two streams from either side of the manifold chamber will meet and balance. If the knob is left untouched in this intermediate position the vehicle will move to the point at which the two streams of air balance, and it will hover there. By partly turning the control knob, one can vary the vehicle's speed as well as change its direction. The knob setting has different effects for different sections of the track. To keep the vehicle at a constant slow speed, for example, one must turn the knob slowly as the vehicle moves around the track. After one has acquired the skill, a great deal of control can be exercised over the vehicle by turning the knob. It is the element of skill that makes my invention suitable as a toy vehicle racer system. When a user has acquired the skill to control the speed and direction of one vehicle, he can add another and try to control both at the same time, still using the single knob. The only limit to the number of vehicles that will operate simultaneously is the ability of the track to accommodate them.

The vehicle's top speed capabilities can be increased if an upward extending member 29 is attached to the front of the vehicle. I shall henceforward refer to this member 29 as the vertical propulsion wing or merely the propulsion wing. The principle of the propulsion wing's operation is the same as that of the basic airplane wing, but the realization and application are different. In the case of the airplane wing, the air flowing over the upper surface is made to travel faster than the air which passes under the wing because of the wing's shape. The difference in velocities results in a difference of pressures on the upper and lower wing surfaces. The high velocity air has a lower pressure than the low velocity air, and the result is a net upward pressure and hence a net upward force on the wing. In the case of my vertical propulsion wing, air emitted from the apertures 19 passes upward parallel to the front surface of the propulsion wing 29 as shown in FIG. 7. Air to the left side of the propulsion wing in the diagram, i.e. the air which occupies the volume above the vehicle's main body 28, is relatively motionless. This air may be slightly turbulent due to the effects of air currents from underneath and behind the vehicle, but it has a negligible velocity compared with the air from the jets which is passing in front of the propulsion wing. The difference in air velocity between the front and back surfaces of the propulsion wing results in a greater pressure on the back side, since the moving air in front of the propulsion wing has a smaller pressure than the relatively motionless air behind the propulsion wing. The pressure difference creates a net force on the back surface of the propulsion wing which increases the vehicle's forward speed. The propulsion wing's operation is not dependent on any impingement of air jets on a surface, but on the flow of air parallel to a surface.

The force resulting from the propulsion wing effect is not as great as the shearing force of the air jets on the bottom of the vehicle. If a vehicle equipped with a propulsion wing is in high speed operation, and the direction of the air jets is reversed by turning control knob 25, the vehicle will reverse its direction but will travel at a much slower speed. If high speed operation is desired in the new direction, the vehicle can be flipped around manually so that the vertical propulsion wing is again at the front end of the vehicle with respect to the vehicle's direction of motion.

Having thus fully described my invention, what I claim as new and desire to secure by Letters Patent, is:

1. An air supported and air propelled vehicle racer comprising:
   (a) a continuous track having a circular arc cross-section and having a plenum chamber below the track,
   (b) apertures in the surface of the track opening into said plenum chamber,
   (c) an air pressure source for said plenum chamber,
   (d) a vehicle having a circular arc lower surface complemental to the curvature of the track for movement over said track propelled by the air under pressure being discharged through said apertures, and (e) wherein the plenum chamber is provided with a valve chamber spaced below the track and having the air source entering the valve chamber and its direction controlled by interconnected hinged flaps at the ends of said chamber.

2. A device as set forth in claim 1, wherein said vehicle is provided with a forward upwardly extending fin actuated by the forward force of air in advance of the fin.

References Cited

UNITED STATES PATENTS

| 756,600 | 4/1904 | Dodge | 302—29 |
| 1,411,597 | 4/1922 | Trask | 104—23 |
| 1,837,055 | 12/1931 | McDaniel | 104—24 |
| 3,302,587 | 2/1967 | Knox | 104—23 |

ARTHUR L. LA POINT, Primary Examiner